US012708994B2

(12) United States Patent
Stierle et al.

(10) Patent No.: US 12,708,994 B2
(45) Date of Patent: Aug. 18, 2026

(54) HAND-HELD POWER TOOL

(71) Applicant: Robert Bosch GmbH, Stuttgart (DE)

(72) Inventors: Peter Stierle, Pliezhausen (DE); Thomas Schomisch, Filderstadt (DE); Rico Unger, Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 18/572,053

(22) PCT Filed: Jun. 14, 2022

(86) PCT No.: PCT/EP2022/066106
§ 371 (c)(1),
(2) Date: Dec. 19, 2023

(87) PCT Pub. No.: WO2023/274709
PCT Pub. Date: Jan. 5, 2023

(65) Prior Publication Data

US 2024/0278411 A1 Aug. 22, 2024

(30) Foreign Application Priority Data

Jun. 28, 2021 (DE) ..................... 10 2021 206 665.8

(51) Int. Cl.
*B25F 5/00* (2006.01)
*B24B 23/02* (2006.01)
*B24B 55/05* (2006.01)

(52) U.S. Cl.
CPC ............ *B25F 5/008* (2013.01); *B24B 55/052* (2013.01); *B24B 23/028* (2013.01)

(58) Field of Classification Search
CPC ........................................................ B25F 5/008
See application file for complete search history.

(56) References Cited

U.S. PATENT DOCUMENTS

| | | | | |
|---|---|---|---|---|
| 9,821,433 | B2 | 11/2017 | Copeland et al. | |
| 2005/0196273 | A1* | 9/2005 | Nishikawa ............... | H02K 9/06 415/206 |
| 2020/0078922 | A1 | 3/2020 | Petrovic | |
| 2020/0099275 | A1* | 3/2020 | Lv ............................ | H02K 9/26 |

FOREIGN PATENT DOCUMENTS

| | | | |
|---|---|---|---|
| DE | 10 2008 011 589 | B3 | 4/2009 |
| DE | 10 2008 041 370 | A1 | 2/2010 |
| DE | 21 2013 000 108 | U1 | 11/2014 |
| DE | 11 2018 000 849 | T5 | 10/2019 |
| EP | 2 181 811 | A1 | 5/2010 |
| JP | 2013-49114 | A | 3/2013 |
| WO | 90/00828 | A1 | 1/1990 |

OTHER PUBLICATIONS

International Search Report corresponding to PCT Application No. PCT/EP2022/066106, mailed Sep. 19, 2022 (German and English language document) (5 pages).

* cited by examiner

*Primary Examiner* — Daniel Jeremy Leeds
(74) *Attorney, Agent, or Firm* — Maginot, Moore & Beck LLP

(57) ABSTRACT

A hand-held power tool, more particularly angle grinder, includes a cooling unit for cooling the hand-held power tool, a machine housing for receiving the cooling unit, and an air inlet opening for admitting an air flow. The hand-held power tool has a dust protection unit for reducing, especially without using a filter, dust particles in the air flow.

17 Claims, 14 Drawing Sheets

HAND-HELD POWER TOOL

This application is a 35 U.S.C. § 371 National Stage Application of PCT/EP2022/066106, filed on Jun. 14, 2022, which claims the benefit of priority to Serial No. DE 10 2021 206 665.8, filed on Jun. 28, 2021 in Germany, the disclosures of which are incorporated herein by reference in their entirety.

The disclosure relates to a hand-held power tool.

BACKGROUND

Hand-held power tools having cooling units that cool the hand-held power tools by means of cooling air passing through the hand-held power tools are known.

SUMMARY

The object of the disclosure is to improve a hand-held power tool by way of simple design measures.

This object is achieved by means of a hand-held power tool, more particularly an angle grinder comprising a cooling unit for cooling the hand-held power tool and comprising a machine housing for receiving the cooling unit.

In particular, the hand-held power tool, in particular the machine housing of the hand-held power tool, comprises an air inlet opening for admitting an air flow.

According to the disclosure, the hand-held power tool comprises a dust protection unit for reducing, especially without using a filter, dust particles in the air flow.

In particular, the dust protection unit is provided to reduce dust particles in an air flow. Preferably, the air flow is provided to flow through the air inlet opening. Preferably, the air flow provided for the air inlet opening is provided for passing through the air inlet opening.

Preferably, the dust protection unit is intended to provide the air inlet opening with an air flow in which dust particles have been reduced.

Preferably a hand-held and/or hand-guided power tool and preferably an angle grinder are considered as a hand-held power tool. It is understood that other hand-held power tools regarded by a skilled person to be advantageous can also be considered. The hand-held power tool can comprise a drive unit for an indirect or direct drive of an accessory device, in particular disk-shaped, preferably a grinding wheel. The drive unit can comprise a drive shaft, which, in particular, is movably supported about a drive shaft. The hand-held power tool can comprise a control or regulating unit for controlling or regulating the hand-held power tool, in particular the drive unit. The hand-held power tool can comprise a toolholder for receiving an accessory device, such as a grinding wheel. The toolholder can be rotatably supported about an output axis. The toolholder can be driveable by means of the drive unit, e.g., in order to operate the accessory device. For this purpose, the hand-held power tool can comprise a gear unit, in particular an angle gear unit. The gear unit can transfer a movement of the drive unit to the toolholder. To operate the hand-held power tool, an actuating element can be provided, which can be operated, in particular in such a way as to put the hand-held power tool, in particular the drive unit, into an operating state. In an actuating state, the drive unit can, e.g., be put into an operating state, in particular to drive the accessory device.

The hand-held power tool comprises a machine housing. The machine housing can surround the drive unit, control unit or regulating unit, the transmission unit, and/or at least partially the toolholder.

The hand-held power tool can be designed to be elongated. The hand-held power tool can extend along a longitudinal axis. The longitudinal axis can be aligned along the greatest extension of the hand-held power tool, in particular the machine housing. The longitudinal axis can coincide with a drive shaft of the drive unit. The hand-held power tool can extend along a transverse axis, which is in particular transverse, preferably perpendicular, to the longitudinal axis.

The hand-held power tool can be substantially cylindrical. The machine housing can have a circumferential area extending around, in particular, a longitudinal axis. The machine housing can have a front area extending transversely, in particular perpendicularly, to a longitudinal axis. The front area can delimit the circumferential area.

The cooling unit can be designed as a fan unit. The fan unit can preferably be provided to generate an air flow for cooling the hand-held power tool. The cooling unit can be provided to direct the air flow through the hand-held power tool. A fan wheel, which is preferably movable indirectly or directly by means of the drive unit, is considered a cooling unit. The cooling unit can be connected to the drive unit, in particular the drive shaft of the drive unit. An impeller through which the flow can pass axially or radially can be considered as a fan wheel. To ensure that the drive unit and the control unit or regulating unit are sufficiently cooled, the cooling unit can be arranged between the drive unit and the control unit, or between the regulating unit and the transmission unit.

The dust protection unit can be provided to reduce dust particles in an air flow—without the use of a dust filter. Debris in the hand-held power tool can be reduced thereby.

The dust protection unit can be provided to cover or to extend beyond the air inlet opening, in particular in an operating state. The dust protection unit can comprise an extension. The air inlet opening can comprise an extension. The, in particular each, extension of the dust protection unit can be larger than one, in particular each, extension of the air inlet opening. The dust protection unit can cover the air inlet opening, in particular in an operating state, on all sides, in particular by at least 1 mm, preferably at least 2 mm, preferably by at least 3 mm, further preferably by at least 4 mm, particularly preferably by at least 5 mm, further preferably by at least 8 mm, further preferably by at least 10 mm. The dust protection unit can be at a distance from the air inlet opening, in particular in an operating state, in particular of at least 0.1 mm, preferably of at least 0.3 mm, more preferably of at least 0.5 mm, particularly preferably of 0.8 mm, further preferably of at least 1 mm, further preferably of at least 1.2 mm, particularly preferably of at least 2.0 mm, and/or by a maximum of 20 mm, in particular by a maximum of 15 mm, preferably by a maximum of 10 mm, further preferably by a maximum of 8 mm, quite preferably by a maximum of 5 mm. The dust protection unit can surround the air inlet opening, in particular in an operating state, at an angle range of 360°. The dust protection unit can cover or overlap the air inlet opening, in particular in an operating state, in particular completely. The dust protection unit can extend at an angle or parallel to the air inlet opening, in particular in an operating state.

The air inlet opening can be formed as a passage through the machine housing. The air inlet opening can extend through the machine housing, in particular through a wall of the machine housing.

In this context, the term “filter-free” is intended to mean that a reduction of dust particles is carried out by means of a dust protection unit without use of a filter element, e.g. a dust particle filter. In particular, the dust protection unit can be free of a dust particulate filter, for example a Hepa filter. A filter element is understood to be an element that divides an air inlet opening into a plurality of smaller air inlet openings (pores).

Preferably, the dust protection unit is intended to make it more difficult or prevent dust particles from passing through the air inlet opening.

It is understood that the air inlet opening optionally comprises or can be covered by a dust particle filter, which, in addition to the dust protection unit, makes it more difficult or prevents dust particles from passing through the air inlet opening, for example.

By means of the dust protection unit, dust entry into the hand-held power tool and associated debris can be reduced. This can prevent debris from settling inside the hand-held power tool and thereby impairing the functionality of the hand-held power tool. In particular in the case of machining metal, metal dust can be generated, which can enter the hand-held power tool. Preferably, the metal dust can attach to electrical contacts and lead to errors on the hand-held power tool, for example by bridging switch contacts. This can result in a short circuit with associated damage to the hand-held power tool.

Further advantageous embodiments of the hand-held power tool are set forth below.

It can be advantageous for the dust protection unit to be provided to divert the air flow, in particular to divert such that the dust particles contained in the air flow are separated. The dust in the air flow can be reduced by, e.g., separating the dust from the air flow by a strong deflection of the dust flow. The dust protection unit can be designed as a dust separator. The dust protection unit can be designed as an inertial or a deflection separator. In this case, an air flow can enter and be diverted by the dust protection unit, in particular such that particularly larger dust particles cannot follow a diversion of the air flow and settle. It is understood that other separation units regarded as advantageous by a skilled person can also be used. The dust protection unit can be arranged externally on the machine housing. The dust protection unit can be provided to remove dust from an air flow before entering the hand-held power tool or the machine housing. Conventionally, an air flow flows substantially unhindered towards the air inlet opening to be able to enter the machine housing through the air inlet opening. In the present case, the air flow through the dust protection unit can be prevented from flowing directly to the air inlet opening. The air flow can be diverted through the dust protection unit. The air flow can flow around the dust protection unit, in particular the dust protection element. The air flow can be "prefiltered" by the dust protection unit to prevent a portion of the dust particles from passing through the air inlet opening. As a result, the air flow can flow around the dust protection unit and separate dust particles.

Furthermore, it can be advantageous for the dust protection unit to extend around the air inlet opening. The dust protection unit can comprise a dust protection element. The dust protection element can extend around the air inlet opening. The dust protection unit, in particular the dust protection element, can surround the air inlet opening, in particular in an operating state, in particular in an angle range of at least 180°, in particular 210°, preferably 240°, further preferably 270°, preferably 300°, preferably 330°, further preferably 360°. One, in particular each, extension of the dust protection unit, in particular the dust protection element, along and/or transverse to the longitudinal axis can be greater than a, in particular each, extension of the air outlet opening along and/or transverse to the longitudinal axis. The dust protection unit, in particular the dust protection element, can be arranged, in particular in an operating state, directly adjacent to, in particular over, the air inlet opening. This can ensure that the air flow provided, in particular for the air inlet opening, is diverted.

Furthermore, it can be advantageous for the dust protection unit, in particular the dust protection element, is provided to form an air gap in an, in particular in each, operating state, in particular for providing an air flow for the air inlet opening. The air gap can be formed by the dust protection unit. The air gap can be formed from the dust protection element and the machine housing. The air gap can surround the air inlet opening. The air gap can comprise an air gap area that is larger than the air inlet area of the air inlet opening. The air gap can surround the air inlet opening. The air gap can comprise an extension that is greater than an extension of the air inlet opening.

The dust protection unit, in particular the dust protection element, can be at a distance from the air inlet opening in an, in particular in each, operating condition. The dust protection unit, in particular the dust protection element, can cover the air inlet opening in an operating state.

It is further proposed that the dust protection unit comprises a spacer element that is provided to form an/the air gap, in particular for providing an air flow for the air inlet opening. The spacer element can be arranged on the dust protection element and/or the machine housing. The spacer element can be provided to keep the dust protection element at a distance from the air inlet opening or the machine housing, in particular in an operating state, in particular to ensure the air gap. The spacer element can be arranged at a distance from the air inlet opening. The spacer element can be provided for spacing and/or, in particular keeping the dust protection element at a distance from the air inlet opening in an operating state in such a way that an air flow, in particular between the dust protection unit and the machine housing, can flow through the air inlet opening. In particular, an air flow past the dust protection unit into the air inlet opening is thereby to be enabled. The spacer element can limit a movement of the dust protection unit, in particular the dust protection element. The spacer element can ensure a minimum distance of the dust protection element from the machine housing. The spacer element can be formed as an elevation. The spacer element can form a stop for the dust protection element and/or the machine housing. This can ensure an air gap for an air flow through the air inlet opening.

Furthermore, it can be advantageous for the dust protection unit to be supported movably, in particular pivotably, relative to the machine housing. The dust protection unit can be spaced or be able to be spaced transversely, in particular perpendicularly, to the air inlet opening relative to the air inlet opening.

It can further be advantageous for the dust protection unit, in particular the dust protection element, to be adjustable as a function of an operating state. The dust protection unit is designed such that the dust particles in the air flow can be reduced as a function of an operating state of the hand-held power tool. The dust protection unit can adjust an air gap as a function of an operating state of the hand-held power tool. The dust particles in the air flow can be reduced in one operating condition than in another operating condition. In particular, a concentration of dust particles in the air flow can be reduced by the air flow being more strongly diverted. Preferably, a concentration of dust particles can be reduced as a function of an air gap. In an operating state, the air gap can be large enough that the air flow is less divertible. In a further operating state, the air gap can be small enough that the air flow is more divertible. As a result, more dust particles can be separated in an operating state of the hand-held power tool, e.g., in a further operating state of the hand-held power tool. The operating states can be adjusted to the power output of the hand-held power tool or the drive unit. At high power output (that tends to produce more grinding dust), the air gap can be small to separate more dust particles from the air flow. At a low power output, the air gap can be large. By this, variable or adjustable dust protection can be provided.

It can be advantageous for the machine housing to have a handle area, in particular for gripping around the hand-held power tool by means of an operator's hand, wherein the dust protection unit and/or the air inlet opening is arranged on the handle area. Preferably, the handle area, in particular in an operating state, is provided for gripping around the hand-held power tool, in particular the machine housing, by means of an operator's hand. Preferably, the dust protection unit and/or the air inlet opening is provided for gripping by means of an operator's hand. The dust protection unit can surround the air inlet opening such that an operator's hand cannot close the air inlet opening. In particular, the dust protection unit is designed to allow air flow even when the dust protection unit is substantially surrounded. As a result, the air inlet opening can be gripped by an operator's hand, but can continue to receive air flow.

It is further proposed that the dust protection unit, in particular a dust protection element, be designed as an actuating element for turning on/off the hand-held power tool or the drive unit of the hand-held power tool. It is further proposed that the dust protection unit, in particular a dust protection element, be designed as a protective hood element for covering an accessory device, in particular a grinding wheel. The actuating element can be designed as an actuating latch. The actuating element can be arranged on the handle area. The actuating element can extend along the longitudinal axis. The actuating element can extend relative to the handle area along the longitudinal axis by up to 100%, preferably up to 90%, preferably up to 80%, preferably up to 70%, particularly preferably up to 60%, and/or at least 20%, preferably at least 30%, preferably at least 40%, particularly preferably at least 50%, further preferably at least 60%. The actuating element can be provided to actuate or turn on and off the hand-held power tool, in particular the drive motor of the hand-held power tool.

The air inlet opening can be arranged, in particular on the machine housing, in particular the circumferential area below the dust protection element designed as the actuating element and in particular arranged such that the actuating element at least reduces dust particles in an air flow provided, for the air inlet opening in particular.

It is proposed that the dust protection unit, in particular the dust protection element, is impermeable to air. The dust protection unit, in particular the dust protection element, can be made of a plastic. The dust protection unit, in particular the dust protection element, can be formed at least in an area surrounding the air inlet opening without passages and/or recesses. In particular, the dust protection unit, in particular the dust protection element, is not to be designed as an air filter element.

Furthermore, it can be advantageous for the hand-held power tool to have a cooling channel that is provided to cool the hand-held power tool, in particular by means of the cooling unit.

The cooling channel can be arranged at the air inlet opening. The cooling channel can connect to an/the air inlet opening. The cooling channel can be fluidically connected to the air inlet opening, in particular connected such that an air flow through the air inlet opening enters the cooling channel. The cooling channel can be designed substantially parallel to the air inlet opening. The cooling channel can extend along a/the longitudinal axis of the hand-held power tool.

The machine housing can comprise an air inlet opening. The machine housing can comprise a further air inlet opening at a distance from the air inlet opening. It is understood that the hand-held power tool, particularly the machine housing of the hand-held power tool, can comprise a single number or plurality of air inlet openings and/or further air inlet openings.

It can be advantageous for the hand-held power tool, in particular the cooling unit of the hand-held power tool, to comprise a cooling channel connecting the air inlet opening, in particular fluidically, to the further air inlet opening. The cooling channel can be provided to cool the hand-held power tool, in particular the drive unit, in particular by means of the cooling unit. The cooling channel can connect or merge an air flow from the air inlet opening and an air flow from the further air inlet opening. As a result, the flow rate of the air flows can be reduced, resulting in fewer or smaller dust particles being carried along with the air flow.

The cooling channel can be substantially closed. The cooling channel can have a transverse, in particular perpendicular, cross-section to a longitudinal axis of the hand-held power tool, which is substantially closed along the longitudinal axis.

The cooling channel can be partially formed from a first housing portion. The cooling channel can be partially formed from a second housing portion. The first housing portion can be provided for receiving a/the drive unit and/or a/the control unit or regulating unit. The second housing portion can receive the first housing portion. The second housing portion can surround the first housing portion. The second housing portion can be inverted over the first housing portion. The second housing portion can be pot-shaped. The cooling channel can be designed with a double wall. A first wall can be formed by the first housing portion. A second wall can be formed by the second housing portion.

The cooling channel can be formed from two housing portions.

An air flow of the air inlet opening and an air flow of the further air inlet opening can open in the same cooling channel.

By means of the cooling channel, a routing of an air flow in and/or through the hand-held power tool can be improved. Internal components can be cooled particularly reliably by directing an air flow by means of the cooling unit or by means of a cooling channel past interfering components, specifically towards the components to be cooled.

Cooling by means of a cooling channel can be particularly advantageous if the cooling channel comprises a plurality of air inlet openings, which are preferably arranged at a distance from one another. In particular, doing so can prevent an air flow for cooling the hand-held power tool or the drive unit from being interrupted when one of the air inlet openings is covered or blocked.

Preferably, by using a plurality of air inlet openings, a larger total air inlet area can be achieved, which on the one hand provides sufficient cooling air flow and on the other hand a flow rate of the cooling air flow can be reduced. At a reduced flow rate, less dust particles are also conveyed in the air flow, thereby reducing debris the hand-held power tool. By means of the cooling channel, the cooling air flow can be fed past interfering components.

The air inlet opening and the further air inlet opening can be arranged at a distance from each other. The air inlet opening and the further air inlet opening can be arranged at a distance from each other such that an air flow can be drawn in at various locations on the machine housing. The cooling channel can be provided for cooling internal components, in particular the control unit or regulating unit and/or the drive unit. The cooling channel is preferably surrounded by the machine housing.

Furthermore, it can be advantageous for the air inlet opening and/or the further air inlet opening, in particular when viewed along a longitudinal axis, to be arranged on a side of the machine housing facing away from a toolholder. The air inlet opening and/or the further air inlet opening can be arranged, in particular along a longitudinal axis, in a rear area of the hand-held power tool. The air inlet opening and the further air inlet opening can be arranged on a side of a/the drive unit facing away from the toolholder and/or the cooling unit. Fewer dust particles can thereby be drawn in.

It is proposed that the air inlet opening extends substantially transversely, in particular perpendicularly, to the further air inlet opening. The air inlet openings can each comprise an air inlet area. The air inlet area(s) can be delimited by the machine housing. The air inlet area of the air inlet opening and the air inlet area of the further air inlet opening can be aligned transversely, in particular perpendicular, to each other. For example, an air flow can be drawn in through the air inlet opening transversely, in particular perpendicularly, to a longitudinal axis, and an air flow can be drawn in through the further air inlet opening along a longitudinal axis. Dust particles drawn in by an air flow can thereby be reduced.

Furthermore, it can be advantageous that the air inlet opening and the further air inlet opening are arranged, in particular transverse, preferably perpendicularly to the longitudinal axis as viewed, on a side of the machine housing facing the toolholder. The air inlet opening and the further air inlet opening are arranged transversely, in particular perpendicularly, to the longitudinal axis as viewed on the same side as a/the toolholder of the hand-held power tool. The hand-held power tool can comprise an actuating element which is arranged, in particular transversely, in particular perpendicularly, relative to the longitudinal axis, on a side of the machine housing facing the toolholder. It can thereby be ensured that an operator of the hand-held power tool will try to prevent sparks from flying in the area of the actuating element, as the operator's hand is usually present in this area.

It is proposed that the air inlet opening be arranged between the cooling unit and the further air inlet opening. It is further proposed that the air inlet opening extends along the longitudinal axis. The air inlet opening can be designed to be elongated. The air inlet opening can extend substantially parallel to the cooling channel. The air inlet opening can be present in a plurality of air inlet openings. In particular, the air inlet openings can be arranged parallel to one another. The air inlet openings can have different lengths.

The air inlet opening can comprise an air inlet area. The air inlet area can have an area normal that is substantially transverse, in particular perpendicular, aligned with a longitudinal axis of the hand-held power tool. The air inlet area can extend along, in particular substantially parallel to, the longitudinal axis. The air inlet opening can be arranged between an accessory tool and a/the drive unit.

The further air inlet opening can comprise a further air inlet area. The further air inlet area can comprise an area normal, which is aligned along, in particular substantially parallel to, the longitudinal axis. The further air inlet area can extend transversely, in particular perpendicular, to the longitudinal axis.

Furthermore, it can be advantageous for the machine housing to comprise a housing recess in which the further air inlet opening is arranged. The housing recess can be arranged on a side of the hand-held power tool facing away from the toolholder. The housing recess can delimit the machine housing along and transversely, in particular perpendicularly, relative to the longitudinal axis. The housing recess can be delimited by a side wall. The side wall can delimit a recess of the housing recess. The side wall can surround a recess of the housing recess, in particular completely. The housing recess can be angular in cross-section, in particular L-shaped. The housing recess can comprise a longitudinal portion. The housing recess can comprise a transverse, in particular perpendicular, transverse portion extending from the longitudinal portion. The longitudinal portion and the transverse portion can be connected. The longitudinal portion and the transverse portion can form an air chamber. The air chamber can ensure that an air flow can flow through the longitudinal section into the transverse section if, e.g., the transverse section is cursorily covered by the operator's hand.

Furthermore, it can be advantageous for the hand-held power tool to comprise a control unit or regulating unit extending along the cooling channel. The control unit or regulating unit is provided for controlling or regulating the hand-held power tool. The air inlet opening can be arranged between the control unit or regulating unit and the cooling unit. In particular, an air flow of the further air inlet opening can be provided for cooling the control unit or regulating unit. Preferably, an air flow of the air inlet opening can be provided for cooling the drive unit. An advantageous separation of functions can thereby be achieved.

BRIEF DESCRIPTION OF THE DRAWINGS

Further advantages will become apparent from the description of the drawings hereinafter. The drawings illustrate exemplary embodiments of the disclosure. The drawings, the description, and the claims contain numerous features in combination. The skilled person will advantageously also consider the features individually and merge them in order to provide further advantageous combinations. Shown are:

In the following drawings, identical components are provided with identical reference signs.

DETAILED DESCRIPTION

Figure 1:
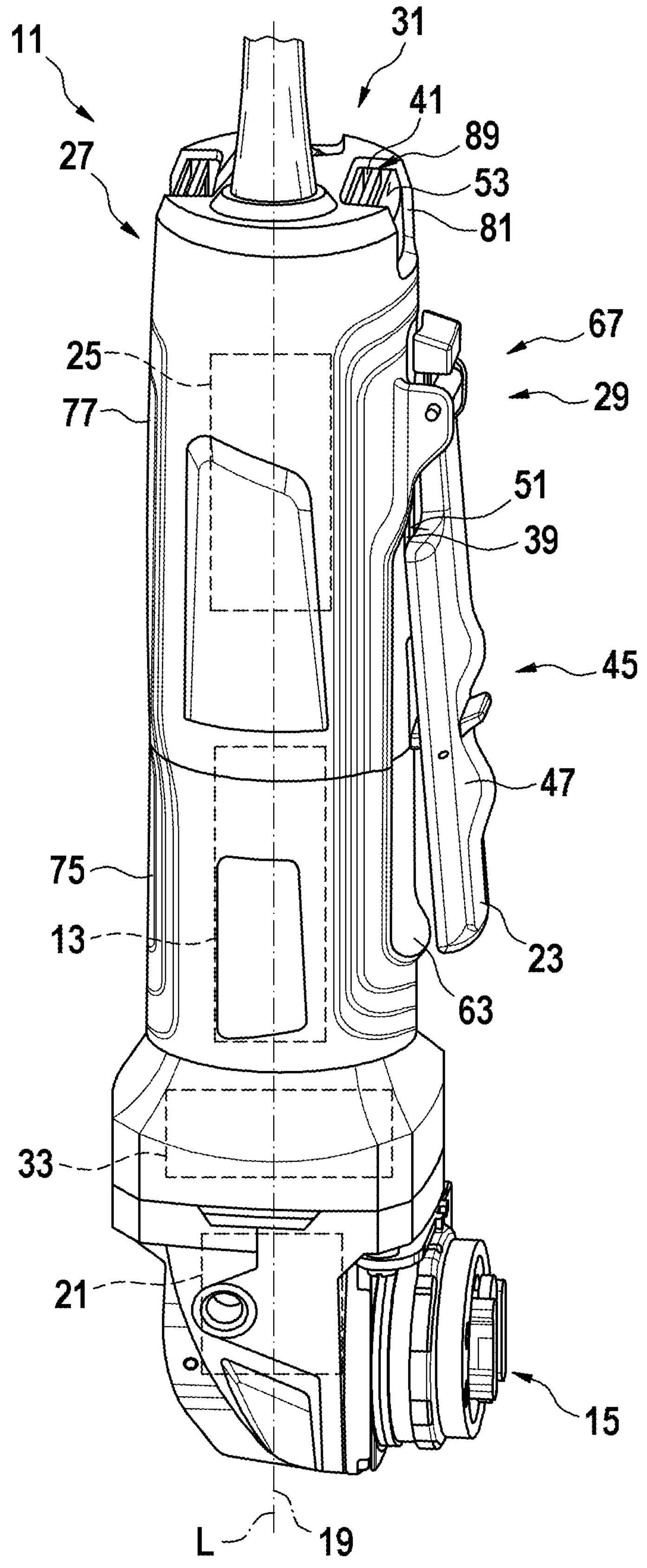
FIGS. 1 to 2 a side view of a hand-held power tool according to the present disclosure, FIG. 3 a section through the hand-held power tool, FIG. 4 a perspective view of the hand-held power tool, FIG. 5 a section through a part of the hand-held power tool, FIGS. 6*a*, 6*b* each show a further section through the hand-held power tool, FIG. 7 a further view of the hand-held power tool, FIG. 8 a section through a part of the hand-held power tool, FIG. 9 a further section through a part of the hand-held power tool, FIG. 10 a perspective view of the hand-held power tool, FIG. 11, FIG. 12 a perspective view of each of a machine housing piece of the hand-held power tool, and FIG. 13, 14 a development of a hand-held power tool.

FIG. 1 shows a hand-held power tool 11 designed as an angle grinder. To supply electrical energy to the hand-held power tool 11, the hand-held power tool 11 comprises a power cord. It is understood that the hand-held power tool 11 can also be operable by means of a battery. The hand-held power tool 11 is hand-held and hand-guided. In order to properly operate the hand-held power tool 11, an additional hand grip (not shown in more detail herein) is required and can be releasably connected to the hand-held power tool 11. The hand-held power tool 11 comprises a drive unit 13 having a drive shaft 15 movably supported about a drive axis 17 to an indirect drive of an accessory device designed as a grinding wheel not shown in more detail. To receive the accessory device, the hand-held power tool 11 comprises a toolholder 15 which is rotatably supported about an output axis 19. To transfer a movement from the drive unit 13 to the toolholder 15, the hand-held power tool 11 comprises a transmission unit 21 designed as an angle gear. To operate the hand-held power tool 11, an actuating element 23 is provided, which is provided to set the drive unit 13 into an operating state to drive the accessory device. The hand-held power tool 11 comprises a control unit or regulating unit 25 for controlling or regulating the drive unit 13.

The hand-held power tool 11 comprises a machine housing 27 which receives and surrounds the drive unit 13, the control unit or regulating unit 25, the transmission unit 21, and at least partially the toolholder 15.

The machine housing 27 of the hand-held power tool 11 is designed to be elongated and extends along a longitudinal axis L, which forms substantially a greatest extension of the hand-held power tool 11, and the longitudinal axis L coincides with the drive shaft 17 of the drive unit 13. The machine housing 27 is substantially cylindrical and has a circumferential area 29 extending around the longitudinal axis L. The machine housing 27 further comprises a front area 31 extending transversely, in particular perpendicularly, to a longitudinal axis L and to the circumferential area 29. The front area 31 delimits the machine housing 27 along the longitudinal axis L. The front area 31 is arranged on a side of the machine housing 27 facing away from the toolholder 15.

The hand-held power tool 11 comprises a cooling unit 33 for cooling the hand-held power tool 11. The cooling unit 33 is designed as a fan unit 33 and is designed to provide an air flow 35, 37 for cooling the drive unit 13 and the control unit or regulating unit 25. The cooling unit 33 is provided to direct the air flow 35, 37 through the machine housing 27 of the hand-held power tool 11. The cooling unit 33 is provided, on the one hand, to generate a negative pressure to form an air flow 35, 37, which enters the machine housing 27 through the air inlet opening 39, 41 and, on the other hand, to generate a positive pressure to guide the air flow 35, 37 through an air outlet opening out of the machine housing 27. A fan wheel, which is arranged on the drive shaft 15 of the drive unit 13 and is directly movable by means of the drive unit 13, can be considered as a fan unit 33. An impeller through which the flow can pass axially or radially can be considered as a fan wheel. To ensure that the drive unit 13 and the control unit or regulating unit 25 are sufficiently cooled, the cooling unit 33 is arranged between the drive unit 13 and the control unit, or between the regulating unit 25 and the transmission unit 21, and is surrounded by the machine housing 27.

An air inlet opening 39 is provided to generate an air flow 35 through the machine housing 27. The air inlet opening 39 extends through the machine housing 27 or through a wall of the machine housing 27. The air inlet opening 39 is designed as a wall passage in the machine housing 27. The air inlet opening 39 is provided for admitting an air flow 35. The drive unit 13 or the control unit or regulating unit 25 is arranged between the fan unit 33 and the air inlet opening 39.

The hand-held power tool 11 comprises a dust protection unit 45 for filter-free reduction of dust particles in an air flow 35 provided for the air inlet opening 39. The air flow 35 provided for the air inlet opening 39 is provided for passing through the air inlet opening 39.

The dust protection unit 45 is provided to divert the air flow 35, in particular to divert it such that the dust particles contained in the air flow 35 are separated, whereby the dust in the air flow 35 can be reduced. The dust protection unit 45 is designed as a dust separator. The dust separator is designed as an inertial or a deflection separator. By means of the dust protection unit 45, the air flow 35 is diverted so that dust particles located in the air flow 35 can be reduced. The dust protection unit 45 is arranged on the outside of the machine housing 27 and is provided to remove dust from the air flow 35, 37 even before entering the machine housing 27.

Figure 6A:
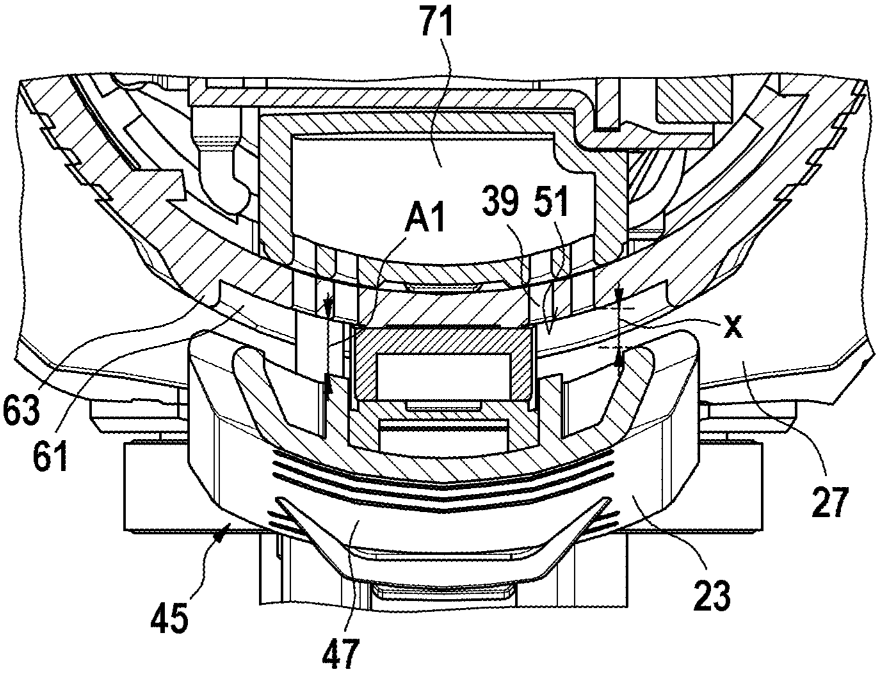
Figure 6B:
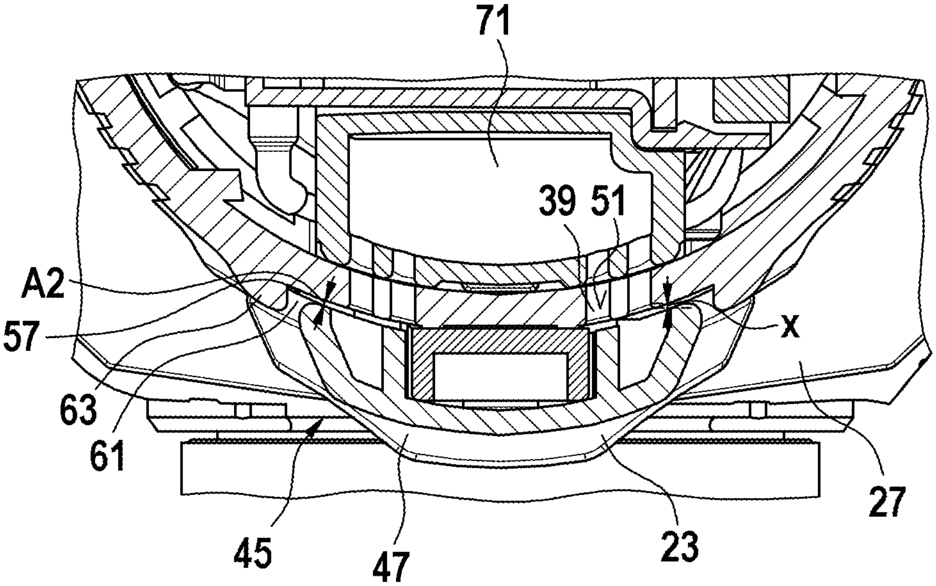
Figure 7:
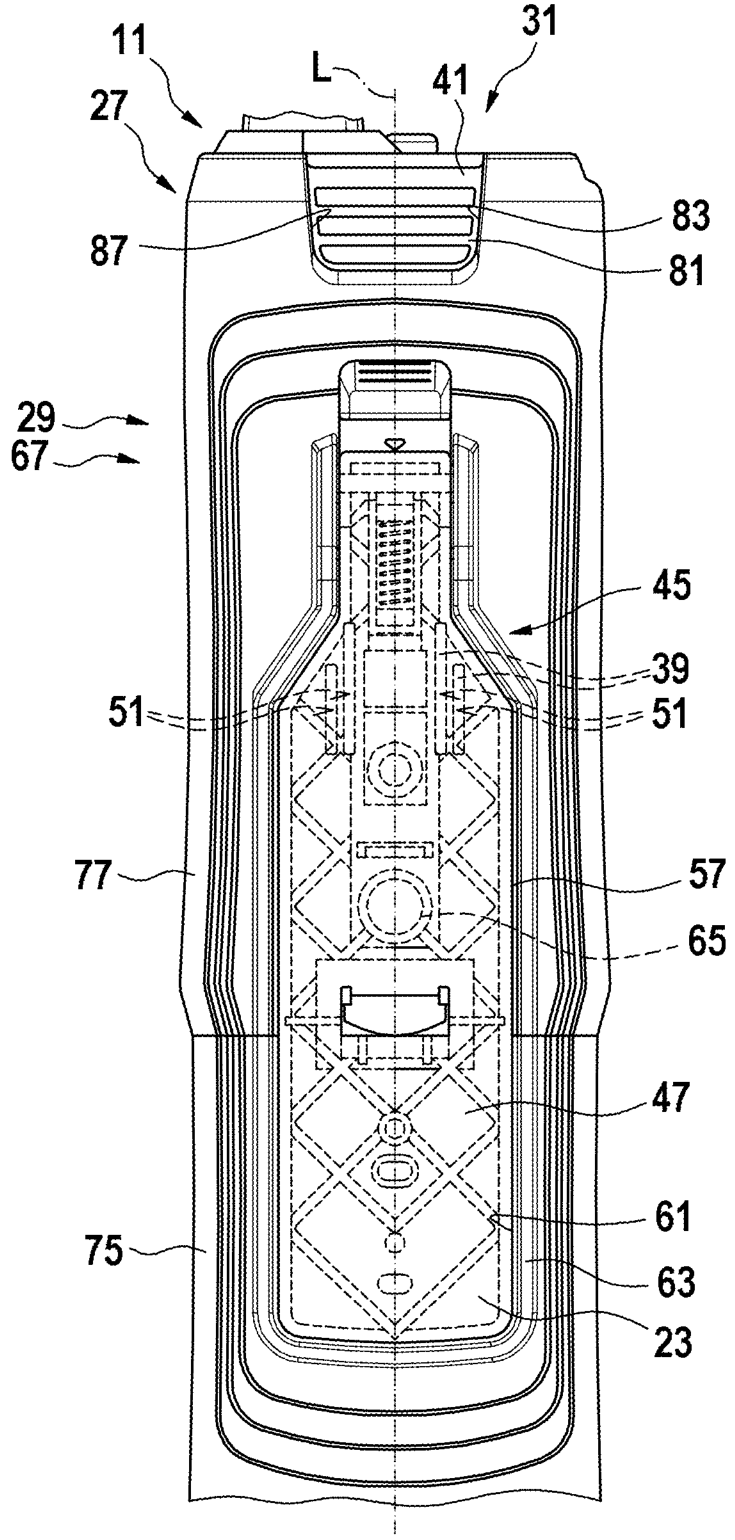
Figure 9:
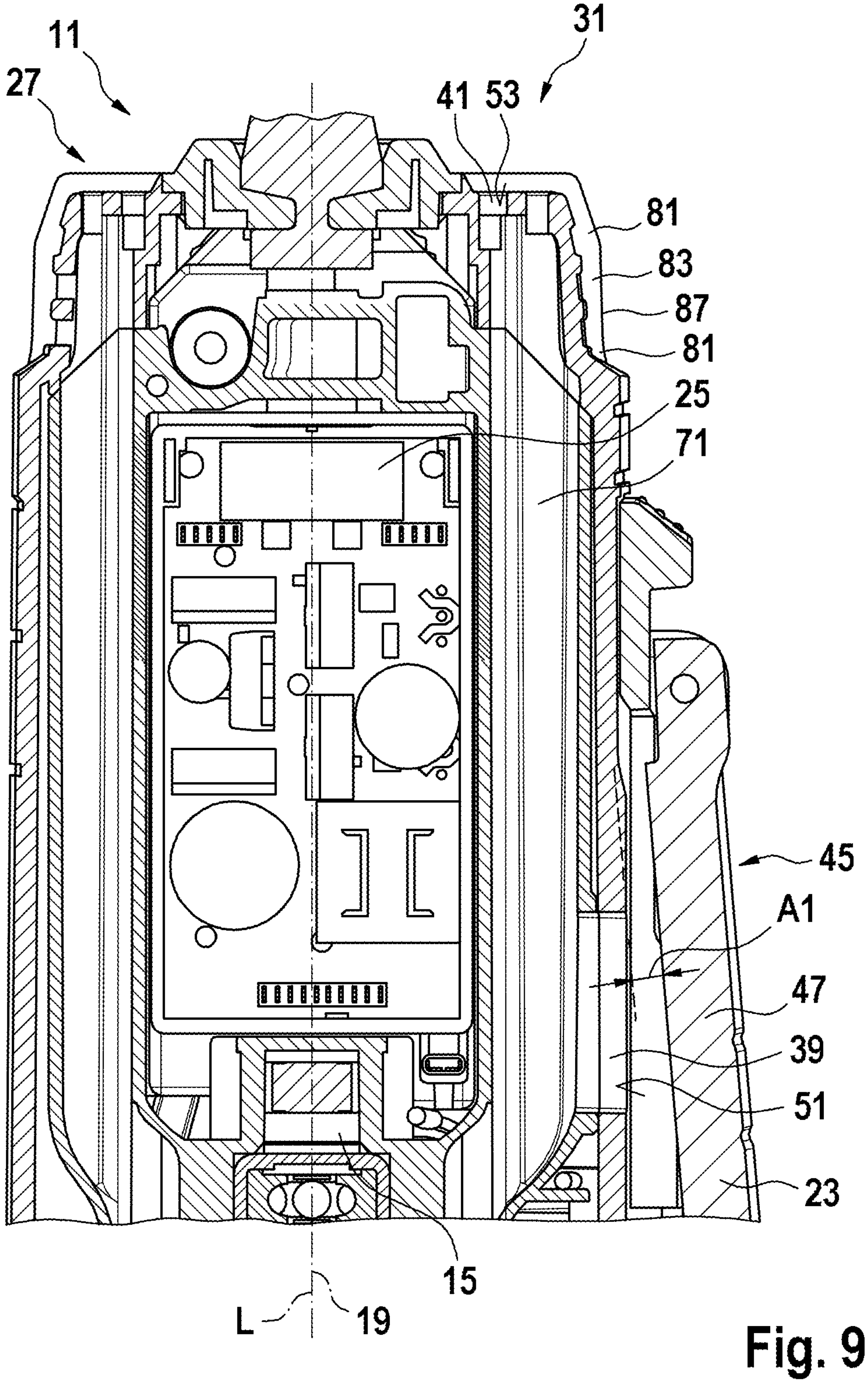
Figure 10:
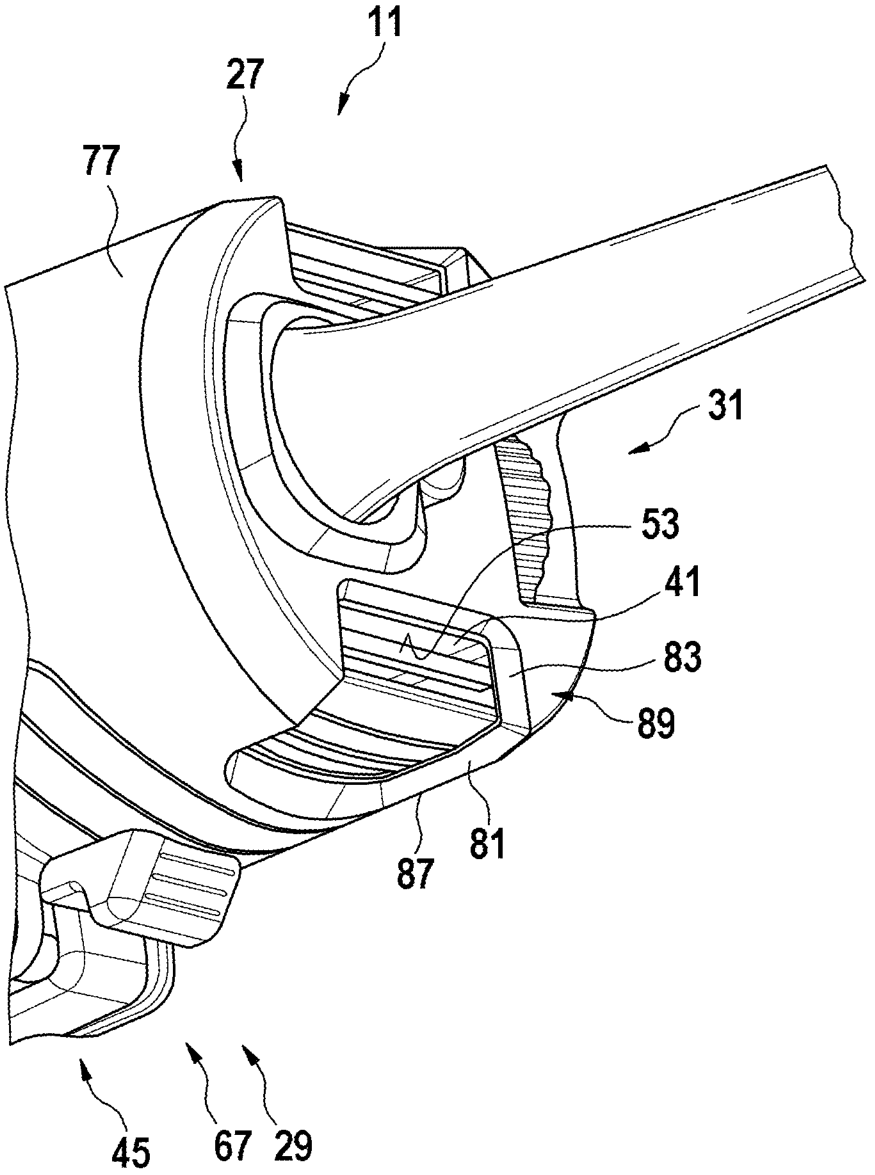

The dust protection unit 45 comprises a dust protection element 47. The dust protection element 47 is provided to cover or project from the air inlet opening 39 in an operating state. The dust protection element 47 overlaps the air inlet opening 39 in each operating condition. The air inlet opening 39 is arranged in the machine housing 27 below the dust protection element 47. Each extension of the dust protection element 47 is larger than each extension of the air inlet opening 39, so that the air inlet opening 39 is covered by at least 3 mm by the dust protection element 47 to all sides in each operating state (FIG. 7). The dust protection element 47 is provided such that the air flow 35 flows around it, at least in certain areas. The dust protection element 47 is at a distance from the air inlet opening 39 of at least 0.5 mm, e.g. about 0.6 mm, (actuating state, FIG. 2), and by no more than 11 mm, e.g. about 4.25 mm (release state, FIG. 1) in each operating state. The dust protection element 47 is at a first distance A1 of more than 4 mm and less than 8 mm in a release state opposite the air inlet opening 39 (FIGS. 6*a*, 9). The dust protection element 47 is at a second distance A2 of more than 1 mm and less than 2 mm in an actuating state opposite the air inlet opening 39 (FIG. 6*b*). The dust protection element 47 is at a first distance A1 of more than 1 mm and less than 2 mm opposite the air inlet opening 39. The dust protection element 47 surrounds the air inlet opening 39 in an operating state at a 360° angular range (FIG. 7). The dust protection element 47 extends in an operating state (actuating state) substantially parallel to the air inlet opening 39 and in a release state angled to the air inlet area 51.

The dust protection element 47 extends around the air inlet opening 39 and surrounds the air inlet opening 39 in an operating state by at least 330°. An, in particular each, extension of the dust protection element 47 along the longitudinal axis L is greater than an, in particular each, extension of the air inlet opening 39 along the longitudinal axis L. An, in particular each, extension of the dust protection element 47 transverse to the longitudinal axis L is greater than an, in particular each, extension of the air inlet opening 39, 41 transverse to the longitudinal axis L. The dust protection element 47 is in an operating state (actuating state) directly adjacent and arranged above the air inlet opening 39 (FIG. 6*b*).

Figure 2:
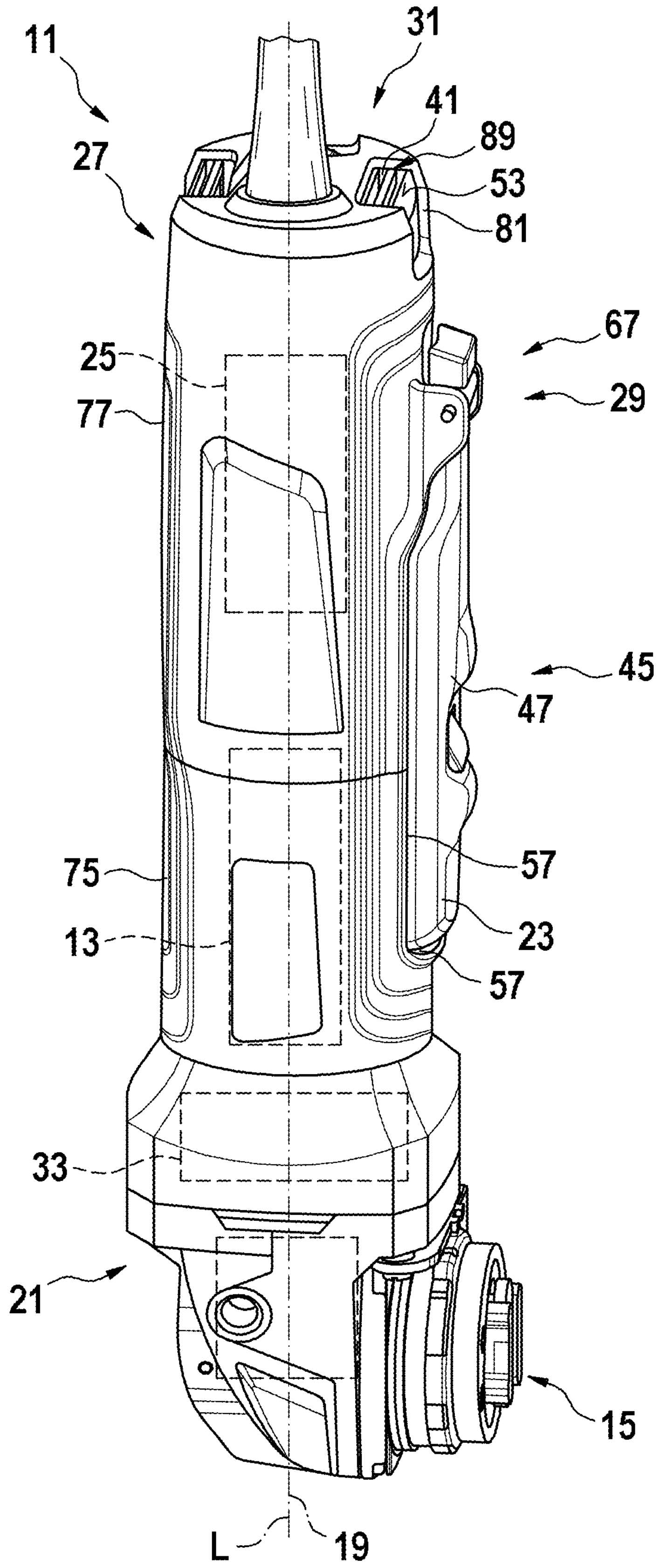
Figure 3:
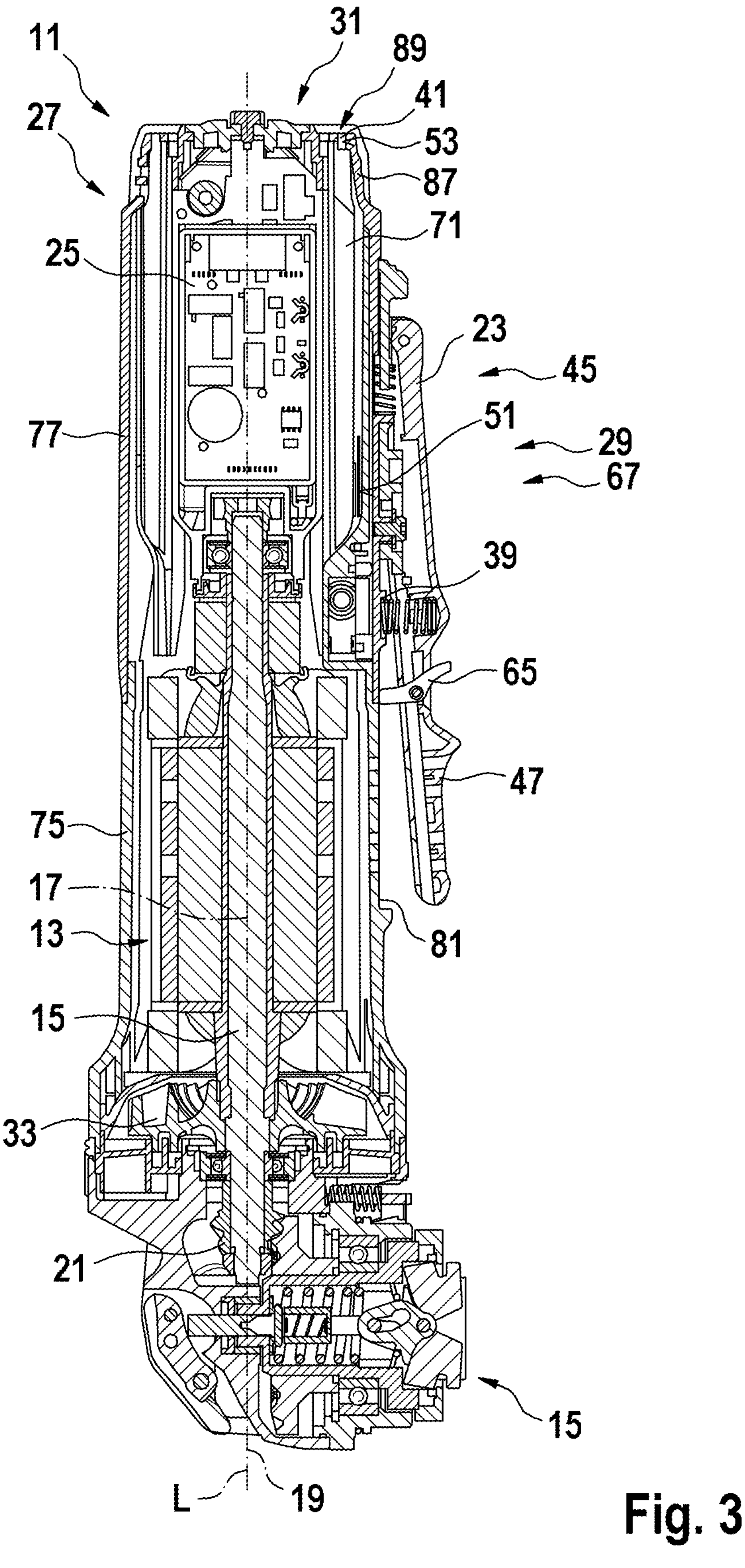

The dust protection unit 45 is provided to form an air gap 57 in each operating state for providing an air flow 35 for the air inlet opening 39 (FIG. 2, FIG. 6). The air gap 57 is formed by the dust protection element 47 and the machine housing 27. The air gap 57 surrounds the air inlet opening 39 and comprises an air gap area which is larger than the air inlet area 51 of the air inlet opening 39, in particular all air inlet openings 39. The air gap 57 substantially completely surrounds the air inlet opening 39, 41. The air gap 57 can have an extension that is greater than an extension of the air inlet opening 39.

The machine housing 27 comprises a recess 61, which is provided for receiving the dust protection element 47. The recess 61 is formed by an elevation 63 of the machine housing 27. The elevation 63 extends around the dust protection element 47. The elevation 63 surrounds the dust protection element 47 at least in one operating state. The elevation 63 is at a distance from the dust protection element 47. As a result, an air flow 35 can flow between the machine housing 27 and the dust protection element 47. The recess 61 or the elevation 63 of the machine housing 27*s* forms the dust protection unit 45 together with the dust protection element 47.

The dust protection element 47 is arranged in an operating state between the air inlet opening 39 and the cooling channel 71 (section, FIG. 6). The dust protection element 47 is arranged in a release state transverse, in particular perpendicular, to the longitudinal axis L when viewed from above the air inlet opening 39, 41. The dust protection element 47 is arranged in an operating state transverse, in particular perpendicular, to the longitudinal axis L when viewed below the air inlet opening 39, 41 (FIG. 6). The dust protection element 47 is at a distance x in a release state with respect to the machine housing 27 (FIG. 6*a*). The dust protection element 47 is at a distance x In an operating state with respect to the machine housing 27, which becomes negative with respect to the distance in the release state (FIG. 6*b*). In the operating state, the air flow 35 is redirected more strongly than in the release state. The dust protection element 47 forms a bottom dead center in a release state and a top dead center in an operating state. In the release state, the dust protection element 47 is at a greater distance from the machine housing 27, as in an operating state.

The dust protection element 47 is at a distance from the air inlet opening 39 in one, in particular in each, operating state. The dust protection element 47 covers the air inlet opening 39 in the, in particular in each, operating state.

Figure 8:
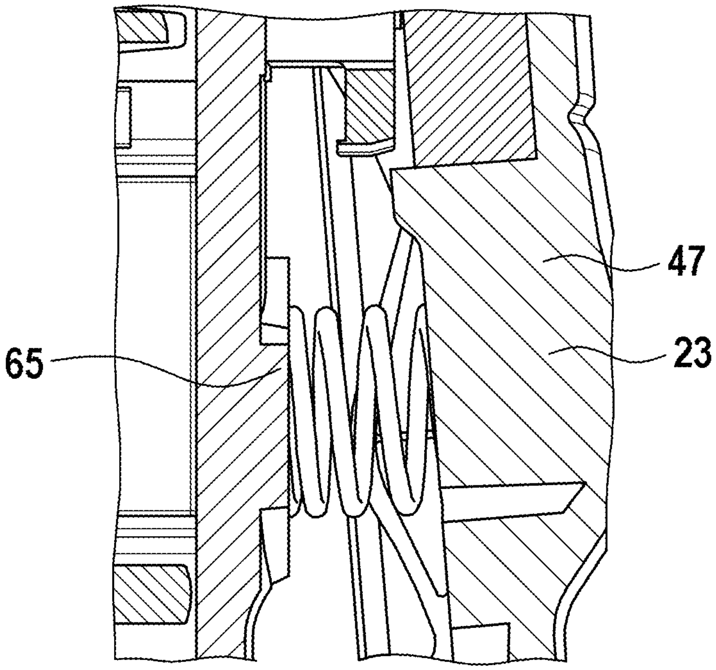

The dust protection unit 45 comprises a spacer element 65, which is provided to form the air gap 57 for providing an air flow 35 for the air inlet opening 39 (FIG. 8). The spacer element 65 is arranged on the machine housing 27. Alternatively or additionally, the spacer element 65 can be arranged on the dust protection element 47, in particular an unlocking unit of the dust protection element 47 (not described in more detail). The spacer element 65 is provided to keep the dust protection element 47 at a distance from the air inlet opening 39 or the machine housing 27 in an operating state. The spacer element 65 is arranged at a distance from the air inlet opening 39 and is provided to keep the dust protection element 47 at a distance from the air inlet opening 39 in an operating state such that an air flow 35 can pass between the dust protection element 47 and the machine housing 27, through the air inlet opening 39. The spacer element 65 limits a movement of the dust protection element 47 and forms a minimum distance of the dust protection element 47 from the machine housing 27. The spacer element 65 is designed as an elevation 63 and receives a spring element. The spring element is provided to return the dust protection element 47 from an operating state to a release state. The spacer element 65 forms a stop for the dust protection element 47 and the machine housing 27.

In one embodiment (not shown in more detail), the dust protection unit 45, in particular the dust protection element 47, can project into the air inlet opening 39 in an operating state.

In one embodiment (not shown in more detail), the dust protection unit 45, in particular the dust protection element 47, can delimit the air inlet opening 39.

The dust protection element 47 is adjustable as a function of an operating state. The dust protection element 47 is designed such that the dust particles in the air flow 35 can be reduced as a function of an operating state of the hand-held power tool 11. The dust protection element 47 adjusts an air gap 57 as a function of an operating state of the hand-held power tool 11. The dust particles in the air flow 35 can be reduced in an operating state (between bottom and top dead center) than in a further operating state (top dead center, as shown in FIG. 6*b*). A concentration of dust particles can be reduced as a function of an/the air gap 57. In an operating state (between bottom and top dead center), the air gap 57 is large enough that the air flow 357 can be deflected more weakly. In a further operating state (FIG. 6), the air gap 57 is small enough that the air flow 35 can be deflected more strongly.

The machine housing 27 comprises a handle area 67 for gripping by the operator's hand. The dust protection unit 45, in particular the dust protection element 47, and the air inlet opening 39 is arranged on the handle area 67. The handle area 67 is provided in an operating state to be gripped the machine housing 27 by the operator's hand. The dust protection element 47 is pivotally supported relative to the machine housing 27 about a pivot axis. The pivot axis is arranged on the machine housing 27 or on the handle area 67 of the machine housing 27.

The dust protection element 47 is designed as an actuating element 23 for turning on/off the hand-held power tool 11 or the drive unit 13 of the hand-held power tool 11.

Figure 13:
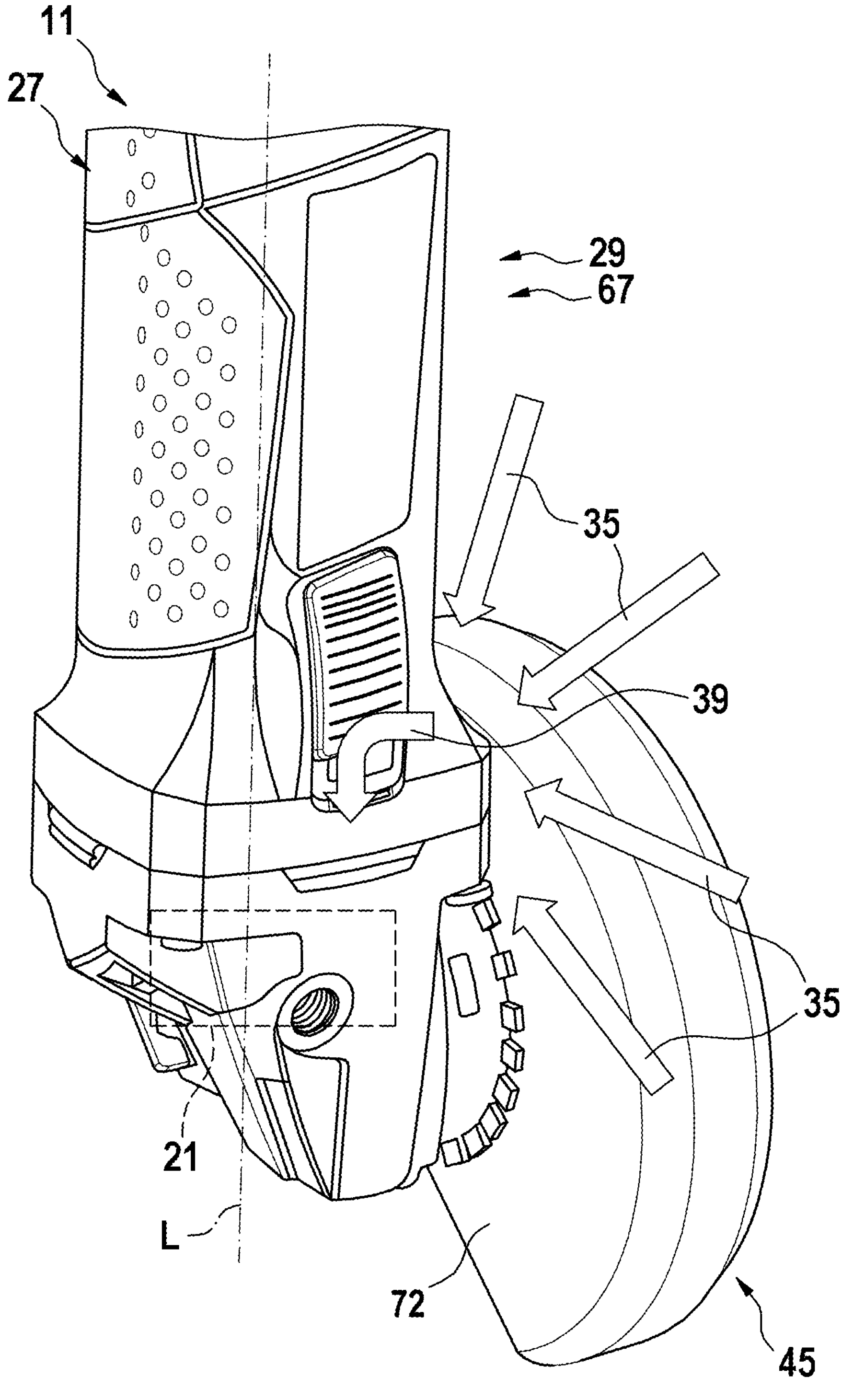
Figure 14:
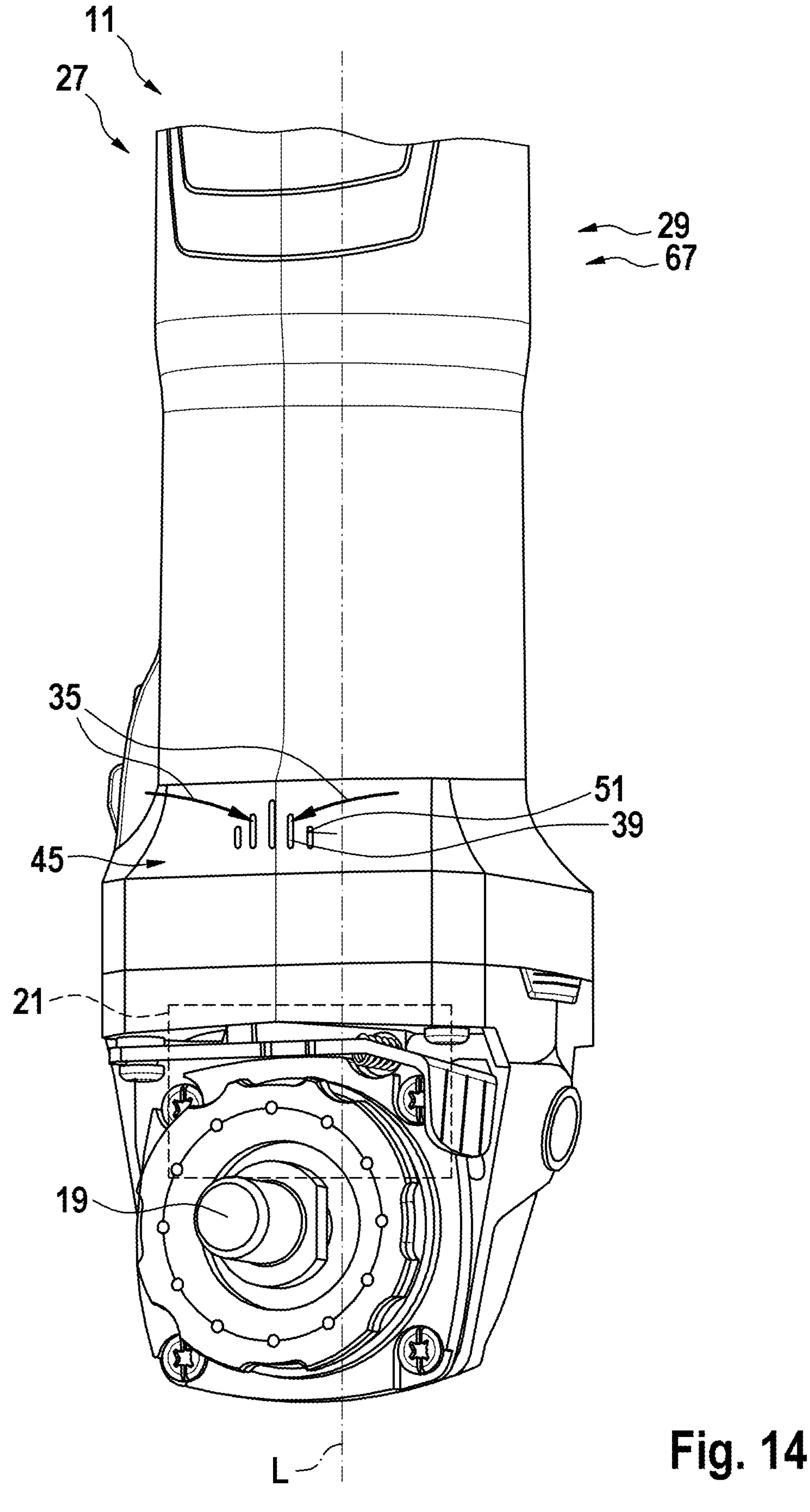

Alternatively or additionally, the dust protection element 47 is designed as a protective hood element for covering an accessory device, in particular a grinding wheel (FIGS. 13, 14). The air inlet opening 39 is thereby arranged below the protective hood element 72. The protective hood member 72 is provided to cover the air outlet opening. The dust protection element 47 designed as a protective hood element 72 is designed to be substantially similar to the dust protection element 47 designed as the actuating element 23. However, in this case, the protective hood element 72 is at a nearly constant distance from the air inlet opening 39, 41. The protective hood member 72 is rotatably supported about the output axis 19 relative to the machine housing 27.

The actuating element 23 is designed as an actuating latch and is arranged on the handle area 67. The actuating element 23 extends along the longitudinal axis L and extends up to 70% opposite the handle area 67 along the longitudinal axis L. The actuating element 23 is provided to actuate or switch the drive motor of the hand-held power tool 11 on and off.

The air inlet opening 39 is arranged at the circumferential area 29 below the dust protection element 47. The dust protection element 47 is impermeable to air. The dust protection element 47 is made of a plastic material. The dust protection element 47 is formed at least in an area surrounding the air inlet opening 39 without passages or recesses.

The hand-held power tool 11 comprises a cooling channel 71, which is provided for cooling the hand-held power tool 11 by means of the cooling unit 33. The cooling channel 71 is arranged at the air inlet opening 39 and adjoins the air inlet opening 39. The cooling channel 71 is fluidically connected to the air inlet opening 39 such that the air flow 35 passes through the air inlet opening 39 into the cooling channel 71. The cooling channel 71 is formed substantially parallel to the air inlet opening 39 and extends along the longitudinal axis L of the hand-held power tool 11. The cooling channel 71 extends substantially parallel to the control unit or regulating unit 25.

The machine housing 27 comprises a further air inlet opening 41 at a distance from the air inlet opening 39. It is understood that the machine housing 27 of the hand-held power tool 11 can comprise a single number or plurality of air inlet openings 39 and/or further air inlet openings 41. In the present case, the machine housing 27 comprises four air inlet openings 39 (FIG. 4) and two further air inlet openings 41. The four air inlet openings 39 are arranged on a handle area 67 of the machine housing 27 and covered by the actuating element 23. The two further air inlet openings 41 are arranged on a front area 31 of the hand-held power tool 11.

The cooling channel 71 is provided to fluidically connect the air inlet opening 39 to the further air inlet opening 41. The cooling channel 71 is provided to cool the drive unit 13 and/or the control unit or regulating unit 25 by means of the cooling unit 33. The cooling channel 71 is substantially closed and has a cross-section perpendicular to a longitudinal axis L of the hand-held power tool 11, which is substantially closed along the longitudinal axis L.

The cooling channel 71 is formed from two housing portions 75, 77. The cooling channel 71 is formed from a first housing portion 75 and a second housing portion 77. The first housing portion 75 and the second housing portion 77 are releasably connectable to each other. The first housing portion 75 is provided to receive the drive unit 13 and the control unit or regulating unit 25. The second housing portion 77 can receive and substantially surround the first housing portion 75. The second housing portion 75 is pot-shaped and is inverted over the first housing portion 75 in a mounting process. The cooling channel 71 is designed to be double-walled, at least in sections. A first wall can be formed by the first housing portion 75 and a second wall can be formed by the second housing portion 77. An air flow 35 of the air inlet opening 39 and an air flow 37 of the further air inlet opening 41 open into the same cooling channel 71, thereby improving an air routing of the two air flows 35, 37 by the hand-held power tool 11. The air flow 37 of the further air inlet opening 41 can be provided for cooling the control unit or regulating unit 25 and/or the drive unit 13. The air flow 35 of the air inlet opening 39 can be provided to cool the drive unit 13. The air flow 35 of the air inlet opening 39 can be provided to cool the air flow 37 of the further air inlet opening 41.

The air inlet opening 39 and the further air inlet opening 41 are arranged substantially along the longitudinal axis L on a side facing away from the toolholder 15 in a rear area of the machine housing 27. The air inlet opening 39 extends substantially transversely, in particular perpendicularly, relative to the further air inlet opening 41. The air inlet openings 39, 41 or the air inlet openings 51, 53 are delimited by the machine housing 27. The air inlet opening 39 and the further air inlet opening 41 each comprise an air inlet area 51, 53. The air inlet area 51 of the air inlet opening 39 and the air inlet area 53 of the further air inlet opening 41 are aligned transversely, in particular perpendicular to each other. The air inlet opening 39 or an area normal of the air inlet area 51 is aligned substantially transversely, in particular perpendicularly, with the longitudinal axis L. The further air inlet opening 41 or another area normal of the air inlet area 53 is substantially aligned along the longitudinal axis L. By means of the air inlet opening 39, an air flow 35 can be drawn in substantially transversely, in particular perpendicularly, to the longitudinal axis L and by means of the further air inlet opening 41, an air flow 37 can be drawn in substantially along the longitudinal axis L.

The air inlet opening 39 and the further air inlet opening 41 are arranged substantially transversely, in particular perpendicularly, on a side of the machine housing 27 facing the toolholder 15 when viewed from the longitudinal axis L. The air inlet opening 39 and the further air inlet opening 41 are arranged below the drive shaft 17.

The hand-held power tool 11 comprises an actuating element 23, which is arranged substantially transversely, in particular perpendicularly, when viewed from the longitudinal axis L on a side of the machine housing 27 facing the toolholder 15. The actuating element 23 is arranged below the drive shaft 17 on the machine housing 27. The actuating element 23 is movably supported about an axis of movement and opposite the machine housing 27. The actuating element 23 comprises a first end and a second end. The actuating element 23 is rotatably connected to the machine housing 27 at the first end. The actuating element 23 comprises a second end. The second end forms a free end, in particular protruding from the machine housing 27. The first end is at a greater distance from the toolholder 15 than the second end.

The actuating element 23, in particular an extension of the actuating element 23, is angled relative to the machine housing 27 in a release state (FIG. 1) and arranged substantially parallel in an actuating state (FIG. 2). The second end of the actuating element 23 is at a further distance from the machine housing 27 in a release state (FIG. 1; FIG. 6*a*), as in an actuating state (FIG. 2, FIG. 6*b*).

Figure 4:
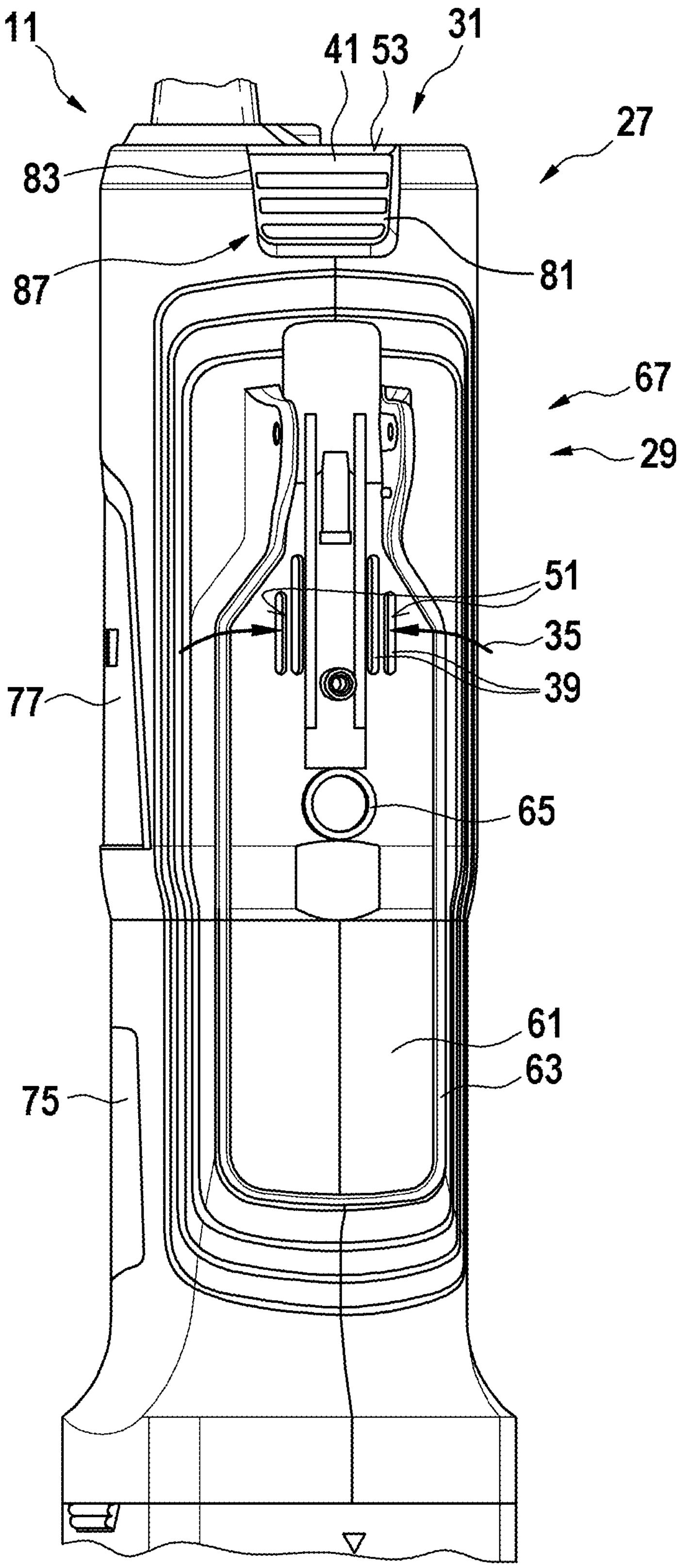
Figure 5:
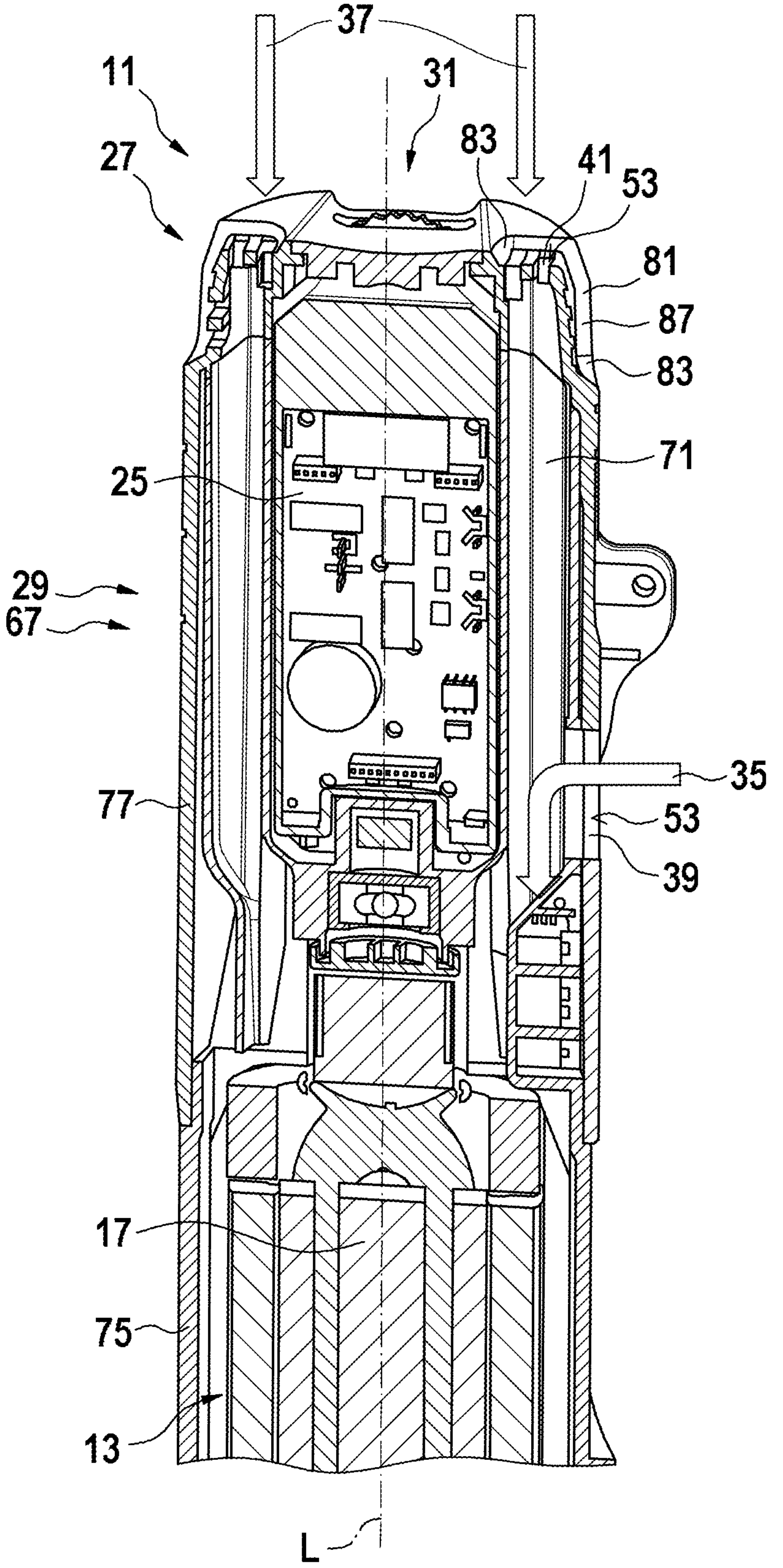

The air inlet opening 39 is arranged along the longitudinal axis L when viewed between the cooling unit 33 and the further air inlet opening 41 and extends along the longitudinal axis L. The air inlet opening 39 is designed to be elongated and extends substantially parallel to the cooling channel 71. The air inlet openings 39 extend parallel to each other and have partially different lengths (FIG. 4, FIG. 7).

Figure 11:
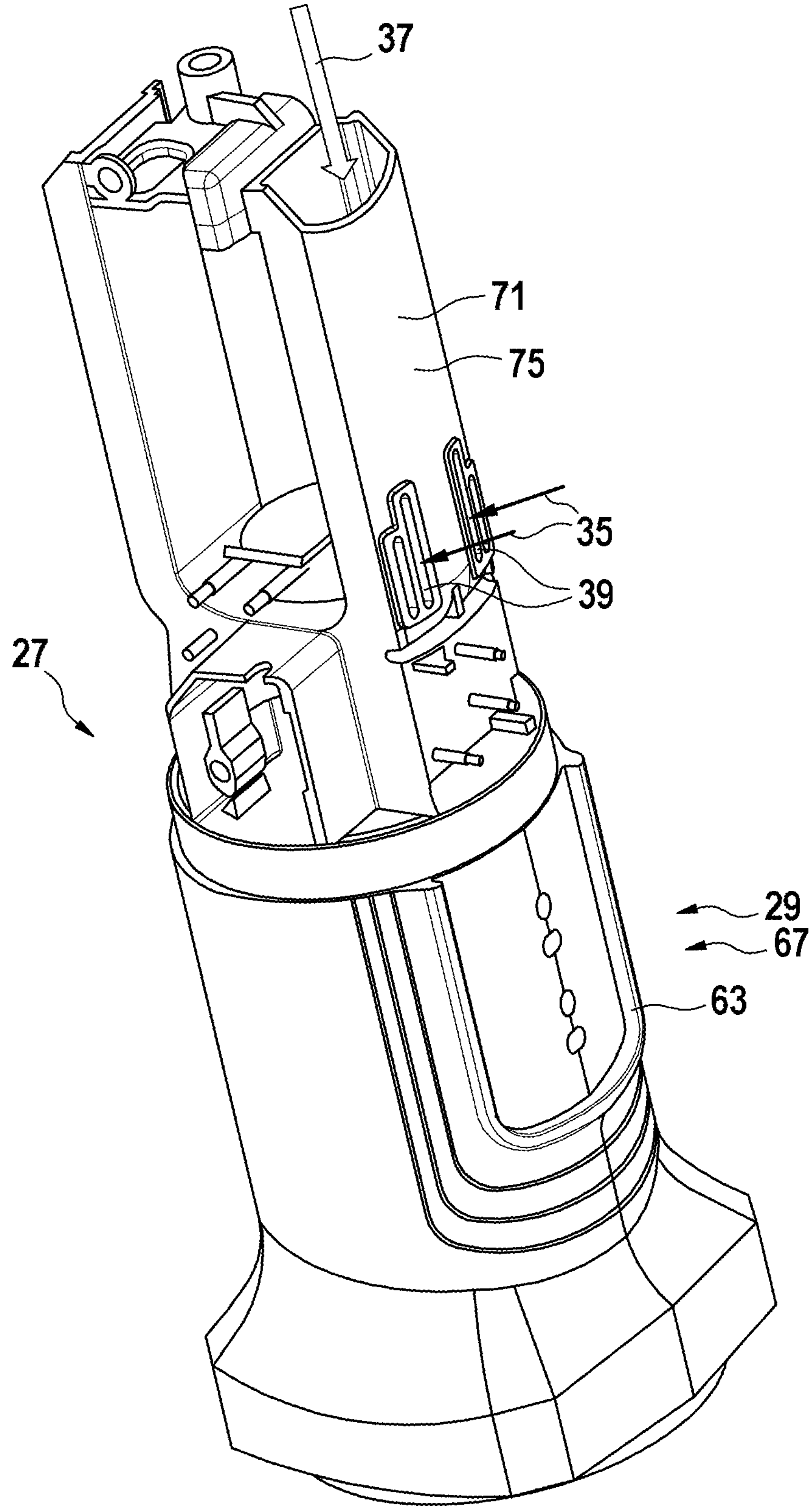
Figure 12:
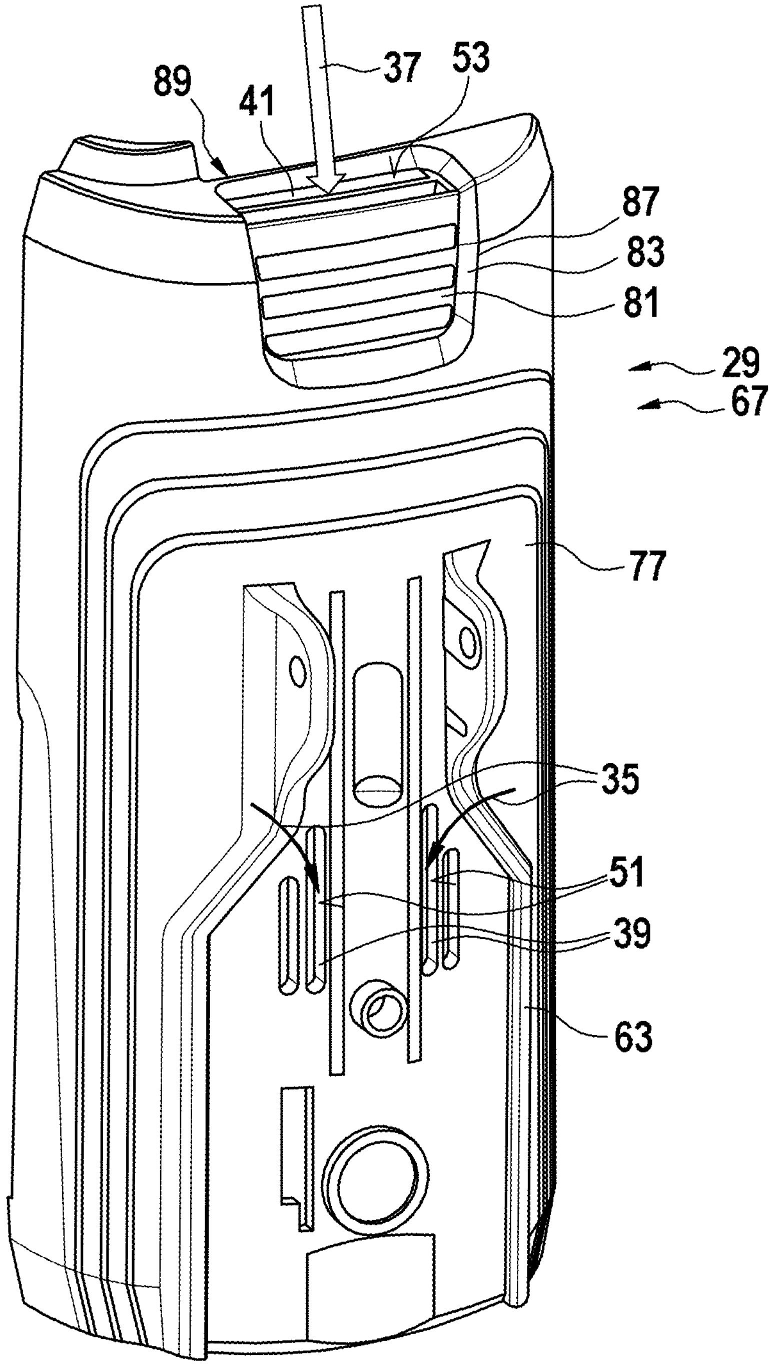

The machine housing 27 comprises a housing recess 81 in which the further air inlet opening 39, 41 is arranged (FIGS. 11, 12). The housing recess 81 is arranged in a side of the hand-held power tool 11 facing away from the toolholder 15. The housing recess 81 is arranged on the front area 31 of the machine housing 27. The housing recess 81 delimits the machine housing 27, in particular along and transversely, in particular perpendicularly, to the longitudinal axis L. The housing recess 81 extends from the front area 31 to the circumferential area or handle area 67. The housing recess 81 is delimited by a sidewall 83, which is delimited by a recess of the housing recess 81. The housing recess 81 is substantially L-shaped in a section through the hand-held power tool 11 (FIGS. 11, 12). The housing recess 81 comprises a longitudinal portion 87 and a transverse portion 89 extending transversely, in particular perpendicular, to the longitudinal portion 87. The longitudinal portion 87 is arranged at the circumferential area 29 and the transverse portion 89 is arranged at the front area 31. The further air inlet opening 41 is arranged in the transverse portion 89. The longitudinal portion 87 and the transverse portion 89 are connected together to form an air chamber.

The invention claimed is:

1. A hand-held power tool, comprising:

a cooling unit configured to cool the hand-held power tool, a machine housing configured to receive the cooling unit, an air inlet opening defined by the machine housing and configured to admit an air flow into the machine housing, and a dust protection unit configured to reduce dust particles in the air flow, the dust protection unit comprising a dust protection element that is arranged outside the machine housing, at least partially covers the air inlet opening, and is spaced apart from the air inlet opening in every operating state of the hand-held power tool, wherein:

the dust protection element has a longitudinal extent defined along a longitudinal axis of the hand-held power tool and a transverse extent defined along a transverse axis of the hand-held power tool, the air inlet opening has an inlet longitudinal extent and an inlet transverse extent, and the longitudinal and transverse extents of the dust protection element entirely encompass the inlet longitudinal extent and the inlet transverse extent of the air inlet opening such that the air flow is diverted around the dust protection element before entering the air inlet opening.

2. The hand-held power tool according to claim 1, wherein the dust protection element defines an air gap in at least one operating state, the air gap enabling the air flow to pass through or around the dust protection element and into the machine housing via the air inlet opening.

3. The hand-held power tool according to claim 2, wherein the dust protection unit further comprises a spacer element configured to space the dust protection element from the machine housing so as to form the air gap between the machine housing and the dust protection element.

4. The hand-held power tool according to claim 1, wherein a spacing between the dust protection element and the air inlet opening is adjustable as a function of an operating state of the hand-held power tool.

5. The hand-held power tool according to claim 1, wherein:

the machine housing comprises a handle area for gripping the hand-held power tool by way of an operator's hand, and the dust protection element and the air inlet opening are arranged on the handle area.

6. The hand-held power tool according to claim 4, wherein the dust protection element is an actuating element configured to switch the hand-held power tool on and off.

7. The hand-held power tool according to claim 1, wherein the dust protection element is made of a material impermeable to air.

8. The hand-held power tool according to claim 1, further comprising a cooling channel which is configured to cool the hand-held power tool by way of the cooling unit, wherein the cooling channel is defined in the machine housing and adjoins the air inlet opening.

9. The hand-held power tool according to claim 1, wherein:

the air inlet opening, when viewed along the transverse axis, is arranged on a side of the machine housing facing a toolholder.

10. The hand-held power tool according to claim 1, wherein the machine housing further defines a further air inlet opening arranged at a distance from the air inlet opening.

11. The hand-held power tool according to claim 10, further comprising a cooling channel defined in the machine housing fluidically connecting the air inlet opening to the further air inlet opening, the cooling channel being configured to cool the hand-held power tool by way of the cooling unit.

12. The hand-held power tool according to claim 1, wherein the hand-held power tool is an angle grinder.

13. The hand-held power tool according to claim 1, wherein the dust protection unit is void of a filter.

14. The hand-held power tool according to claim 1, wherein the dust protection element defines an air gap in every operating state of the hand-held power tool, the air gap enabling the air flow to pass through or around the dust protection element and into the machine housing via the air inlet opening.

15. The hand-held power tool according to claim 10, wherein the dust protection element is formed from a protective hood element configured to cover an accessory device.

16. The hand-held power tool according to claim 15, wherein the accessory device is a grinding wheel.

17. The hand-held power tool according to claim 1, wherein the dust protection element is a paddle switch configured to switch the hand-held power tool on and off.

* * * * *